US008771569B2

(12) United States Patent
Eem Van Der et al.

(10) Patent No.: US 8,771,569 B2
(45) Date of Patent: Jul. 8, 2014

(54) POLYETHYLENE FILM AND METHOD FOR THE MANUFACTURE THEREOF

(75) Inventors: Joris Eem Van Der, Arnhem (NL); Johannes Bos, Apeldoorn (NL); Anton Peter De Weijer, Nijmegen (NL); Sanjay Rastogi, Eindhoven (NL); Gerwin Elderman, Apeldoorn (NL)

(73) Assignee: Teijin Aramid B.V., Arnhem (NL)

( * ) Notice: Subject to any disclaimer, the term of this patent is extended or adjusted under 35 U.S.C. 154(b) by 425 days.

(21) Appl. No.: 13/143,744

(22) PCT Filed: Jan. 6, 2010

(86) PCT No.: PCT/EP2010/050065
§ 371 (c)(1),
(2), (4) Date: Jul. 8, 2011

(87) PCT Pub. No.: WO2010/079174
PCT Pub. Date: Jul. 15, 2010

(65) Prior Publication Data
US 2011/0268951 A1    Nov. 3, 2011

(30) Foreign Application Priority Data

Jan. 9, 2009    (EP) ..................................... 09150304

(51) Int. Cl.
*B32B 27/32*    (2006.01)
*C08F 110/02*    (2006.01)

(52) U.S. Cl.
USPC ............ 264/164; 264/291; 526/352; 525/240

(58) Field of Classification Search
USPC ................... 526/352; 428/220; 264/291, 164; 525/240
See application file for complete search history.

(56) References Cited

U.S. PATENT DOCUMENTS

| | | | |
|---|---|---|---|
| 4,344,908 A | 8/1982 | Smith et al. | |
| 4,953,234 A | 9/1990 | Li et al. | |
| 5,004,778 A | 4/1991 | Waagen et al. | |
| 5,106,555 A | 4/1992 | Kobayashi et al. | |
| 5,106,558 A | 4/1992 | Kobayashi et al. | |
| 5,167,876 A | 12/1992 | Lem et al. | |
| 5,284,411 A | 2/1994 | Enomoto et al. | |
| 5,503,791 A | 4/1996 | Fortuin et al. | |
| 5,578,373 A | 11/1996 | Kobayashi et al. | |
| 5,650,451 A * | 7/1997 | Yagi et al. ..................... | 521/143 |
| 5,756,660 A | 5/1998 | Shiraishi et al. | |
| 6,017,480 A | 1/2000 | Yoshida et al. | |
| 6,265,504 B1 | 7/2001 | Liu et al. | |
| 6,794,033 B2 | 9/2004 | Morin et al. | |
| 6,863,976 B2 | 3/2005 | Morin et al. | |
| 6,951,685 B1 | 10/2005 | Weedon et al. | |
| 7,671,159 B2 | 3/2010 | Rastogi et al. | |
| 7,740,779 B2 | 6/2010 | Harding et al. | |
| 7,964,266 B2 | 6/2011 | Harding et al. | |
| 7,976,930 B2 | 7/2011 | Weedon et al. | |
| 7,993,715 B2 | 8/2011 | Geva et al. | |
| 8,197,935 B2 | 6/2012 | Bovenschen et al. | |
| 2001/0053443 A1 | 12/2001 | Perez et al. | |
| 2003/0127768 A1 | 7/2003 | Morin et al. | |
| 2004/0267313 A1 | 12/2004 | Amery et al. | |
| 2005/0091961 A1 | 5/2005 | Prickett | |
| 2006/0142521 A1 | 6/2006 | Rastogi et al. | |
| 2008/0287990 A1 | 11/2008 | Smit | |
| 2010/0144224 A1 | 6/2010 | De Weijer et al. | |
| 2011/0124835 A1 | 5/2011 | De Weijer et al. | |
| 2011/0268952 A1 | 11/2011 | Eem Van Der et al. | |

FOREIGN PATENT DOCUMENTS

| | | |
|---|---|---|
| EP | 0 231 547 A1 | 8/1987 |
| EP | 0 269 151 A1 | 6/1988 |
| EP | 0 292 074 A1 | 11/1988 |
| EP | 0 374 785 A1 | 6/1990 |
| EP | 0 874 005 A1 | 10/1998 |
| EP | 0 833 742 B1 | 9/2002 |
| EP | 1 627 719 A1 | 2/2006 |
| EP | 1 746 187 A1 | 1/2007 |
| EP | 2 014 445 A1 | 1/2009 |
| JP | A-06-010254 | 1/1994 |
| JP | A-8-26487 | 1/1996 |
| JP | A-2002-180324 | 6/2002 |
| WO | WO 86/05739 A1 | 10/1986 |
| WO | WO 91/12136 A1 | 8/1991 |
| WO | WO 97/00766 A1 | 1/1997 |

(Continued)

OTHER PUBLICATIONS

Third Party Submission dated Oct. 5, 2012 from Japanese Patent Application No. 2011-517906.

(Continued)

*Primary Examiner* — Robert D. Harlan
(74) *Attorney, Agent, or Firm* — Oliff PLC

(57) ABSTRACT

The present invention pertains to a polyethylene film and a process for manufacturing such film. The polyethylene film may have a ratio between the strength in a first direction in the film plane and the strength in a second direction in the film plane perpendicular to the first direction in the range of 0.1-10:1, the strength in at least one direction being at least 0.2 Gpa. The process for manufacturing a polyethylene film may have a starting UHMWPE polymer with an average molecular weight of at least 500,000 grams/mole, an elastic shear modulus determined directly after melting at 160° C. of at most 1.4 MPa, and a Mw/Mn ratio of at most 6 to a solvent-free compacting process and a stretching process under such conditions that at no point during the process the temperature of the intermediate polymer film is raised to a value above its melting point.

24 Claims, No Drawings

(56) References Cited

FOREIGN PATENT DOCUMENTS

| WO | WO 01/21668 A1 | 3/2001 |
| WO | WO 2004/113057 A1 | 12/2004 |
| WO | WO 2006/107197 A1 | 10/2006 |
| WO | WO 2009/007045 A1 | 1/2009 |

OTHER PUBLICATIONS

Mitani et al., "Unprecedented Living Olefin Polymerization Derived from an Attractive Interaction between a Ligand and a Growing Polymer Chain," Chem. Eur. J., vol. 9, pp. 2396-2403, 2003.

Wang et al., "Rolling and Roll-Drawing of Ultrahigh Molecular Weight Polyethylene Reactor Powders," Journal of Applied Polymer Science, vol. 43, pp. 1559-1564, 1991.

van der Werff et al., "Tensile deformation of high strength and high modulus polyethylene fibers," Colloid Polymer Science, vol. 269, pp. 747-763, 1991.

Sep. 5, 2008 International Search Report and Written Opinion issued in International Application No. PCT/EP2008/005385.

Oct. 5, 2009 International Search Report and Written Opinion issued in International Application No. PCT/EP2009/058641.

Mar. 16, 2010 International Search Report and Written Opinion issued in International Application No. PCT/EP2010/050063.

Feb. 5, 2009 European Search Report issued in European Application No. 08160053.8.

Jun. 19, 2012 Office Action issued in U.S. Appl. No. 12/452,526.

Ihara et al., "Single site polymerization of ethylene and 1-olefins initiated by rare earth metal complexes," Macromol. Chem. Phys., vol. 197, pp. 1909-1917, 1996, Hüthig & Wepf Verlag, Zug.

Sep. 29, 2009 International Search Report issued in PCT/EP2009/058992.

Sep. 29, 2009 Written Opinion issued in PCT/EP2009/058992.

U.S. Appl. No. 13/467,729, filed in the name of Soon Joo Bovenschen et al. May 9, 2012.

U.S. Appl. No. 13/054,618, filed in the name of Soon Joo Bovenschen et al. Jan. 18, 2011.

U.S. Appl. No. 13/144,038, filed in the name of Joris Eem Van Der et al. Jul. 11, 2011.

U.S. Appl. No. 13/003,361, filed in the name of Anton Peter De Weijer et al. Jan. 10, 2011.

U.S. Appl. No. 12/452,526, filed in the name of Anton Peter De Weijer et al. Jan. 7, 2010.

Office Action issued Oct. 20, 2011 in U.S. Appl. No. 13/054,618.

Feb. 5, 2013 Office Action issued in U.S. Appl. No. 13/467,729.

Rastogi, S., et al. "Heterogeneity in Polymer Melts from Melting of Polymer Crystals," Nature Materials, vol. 4, No. 8, Aug. 1, 2005, pp. 635-641.

PhD. Thesis of Lippits, D.R., "Controlling the melting kinetics of polymers; a route to a new melt state," Eindhoven University of Technology, Mar. 6, 2007, ISBN 978-90-386-0895-2.

Jul. 2, 2010 International Search Report issued in International Application No. PCT/EP2010/050065.

Jul. 2, 2010 Written Opinion issued in International Application No. PCT/EP2010/050065.

Research Disclosure, RD 326076, published on Jun. 10, 1991.

U.S. Office Action dated Oct. 9, 2013 from U.S. Appl. No. 13/003,361.

\* cited by examiner

POLYETHYLENE FILM AND METHOD FOR THE MANUFACTURE THEREOF

BACKGROUND

The present invention pertains to a polyethylene film and a method for manufacturing such films from at least a polyethylene starting material.

RELATED BACKGROUND ART

U.S. Pat. No. 5,503,791 describes a polyethylene film manufactured by casting a solution of a polyolefin in a first solvent, followed by cooling, the removal of the solvent and crystallization of UHMWPE and stretching of the film. A disadvantage of the thus obtained film is that it always contains a certain amount of residual solvent, which may detrimentally affect the properties of the film. In general the amount of solvent present in solution of gel-cast films is at least 100 ppm.

EP292074 describes a method for processing polyolefins with a Mw of more than 400,000, in particular between 500,000 and 10,000,000, a low entanglement density, and a Mw/Mn of less than 10, preferably less than 5 at a temperature below the melting point of the polymer using a process auxiliary agent. The polyolefin is first compressed in the presence of a processing aid, and then subjected to solid state processing. The processing aids mentioned in this reference are polymer solvents. In the Example 17 wt % of decaline is used. Biaxial stretching is mentioned in general, but the application focuses on monoaxially stretched films.

SUMMARY

There is a need for solvent-free polyethylene films with a high strength in more than one direction in the film plane, and for example, where this can be combined with a low areal weight. Applications where such a film may be of use include membranes (e.g., for gas separation applications or for other applications) in solar applications (for example as carrier foils for solar cells) in packaging applications, in ballistic applications, etc.

DETAILED DESCRIPTION OF EMBODIMENTS

Embodiments of the film disclosed herein may meet these needs. Further advantages of the film will become clear from the specification. Also provided is a process for manufacturing films which meet the above needs.

The polyethylene film may have a ratio between the strength in a first direction in the film plane and the strength in a second direction in the film plane perpendicular to the first direction in the range of 0.1-10:1, the strength in at least one direction in the film plane being at least 0.2 GPa, wherein the polyethylene has a weight average molecular weight of at least 500,000 grams/mole and a Mw/Mn ratio of at most 6.

The polymer film may have a polymer solvent content of less than 0.05 wt %, less than 0.025 wt. %, or less than 0.01 wt. %.

The film may have a ratio between the strength in a first direction in the film plane and the strength in a second direction in the film plane perpendicular to the first direction in the range of 0.1-10:1. Thus, the film may have a limited degree of anisotropy. The strength in the first direction may be about ten times as large or about ten times as small as the strength in the second direction in the film plane perpendicular to the first direction. The degree of anisotropy may be reduced even further. The ratio between the strength in a first direction in the film plane and the strength in a direction in the film plane perpendicular to the first direction, which ratio will further also be indicated as anisotropy ratio, may be in the range of 0.2-5:1, in the range of 0.5-2:1, or in the range of 03-1.4:1.

The film may be a high strength film. The strength in at least one direction in the film plane may be at least 0.2 GPa. The strength of the film in a first direction in the film plane may be at least 0.3 GPa, at least 0.4 GPa, at least 0.5 GPa, at least 0.6 GPa, at least 0.7 GPa, or at least 1 GPa. The strength of the film in one direction may depend on the anisotropy ratio of the film. The closer the anisotropy ratio comes to 1:1, the lower the strength of the film in the first direction will be, but this will be offset by the strength in the second direction. The strength of the film in this context is the tensile strength, determined in accordance with ASTM D882-00.

The strength of the film in a first direction in the film plane and the strength in a direction in the film plane perpendicular to the first direction may both be at least 0.2 GPa. The strength in one direction may be at least 0.3 GPa, at least 0.4 GPa, at least 0.5 GPa, at least 0.6 GPa, or at least 1 GPa, while the strength in the direction in the film plane perpendicular to the first direction may be at least 0.2 GPa.

The strength of the film in a first direction in the film plane and the strength in a direction in the film plane perpendicular to the first direction may both be at least 0.2 GPa, at least 0.3 GPa, at least 0.4 GPa, at least 0.5 GPa, at least 0.6 GPa, at least 0.7 GPa, or at least 1 GPa.

The selection of a polyethylene with specific properties, such as a specific molecular weight and a specific molecular weight distribution, may be used to obtain a film with the desirable strength characteristics discussed above.

The polyethylene may have a weight average molecular weight of at least 500,000 grams/mole and a Mw/Mn ratio of at most 6.

The weight average molecular weight (Mw) of the polymer in the polyethylene film may be at least 500,000 grams/mole such as between $1 \times 10^6$ grams/mole and $1 \times 10^8$ grams/mole. The molecular weight distribution and molecular weight averages (Mw, Mn, Mz) of the polymer are determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. The system is calibrated using sixteen polystyrene standards (Mw/Mn<1.1) in the molecular weight range $5*10^3$ to $8*10^6$ grams/mole.

The molecular weight distribution may be determined using melt rheometry. Prior to measurement, a polyethylene sample to which 0.5 wt % of an antioxidant such as IRGANOX 1010 has been added to prevent thereto-oxidative degradation, may first be sintered at 50° C. and 200 bars. Disks of 8 mm diameter and thickness 1 mm obtained from the sintered polyethylenes are heated fast (~30° C./min) to well above the equilibrium melting temperature in the rheometer under nitrogen atmosphere. For example, the disk was kept at 180° C. for two hours or more. The slippage between the sample and rheometer discs may be checked with the help of an oscilloscope. During dynamic experiments two output signals from the rheometer i.e. one signal corresponding to sinusoidal strain, and the other signal to the resulting stress response, are monitored continuously by an oscilloscope. A perfect sinusoidal stress response, which may be achieved at low values of strain, is indicative of no slippage between the sample and discs.

Rheometry may be carried out using a plate-plate rheometer such as Rheometrics RMS 800 from TA Instruments. The Orchestrator Software provided by the TA Instruments, which makes use of the Mead algorithm, may be used to determine molar mass and molar mass distribution from the modulus vs. frequency data determined for the polymer melt. The data is obtained under isothermal conditions between 160-220° C. To get the good fit angular frequency region between 0.001 to 100 rad/s and constant strain in the linear viscoelastic region between 0.5 to 2% may be chosen. The time-temperature superposition may be applied at a reference temperature of 190° C. To determine the modulus below 0.001 frequency (rad/s) stress relaxation experiments may be performed. In the stress relaxation experiments, a single transient deformation (step strain) to the polymer melt at fixed temperature is applied and maintained on the sample and the time dependent decay of stress is recorded.

The molecular weight distribution of the polyethylene present in the film may be relatively narrow. This is expressed by the Mw (weight average molecular weight) over Mn (number average molecular weight) ratio of at most 6. The Mw/Mn ratio may be at most 4, at most 3, or at most 2.

The film may generally have a thickness in the range of about 0.1-100 microns. The films may be thin films with good properties. The film may have a thickness of at most 35 microns or at most 30 microns. The film thickness may be at most 15 microns, at most 10 microns, at most 7 microns, or at most 4 microns. Thinner films, may have a thickness of at most 3 microns, at most 2 microns, or even at most 1 micron.

The polyethylene film may have a specific value for the uniplanar orientation parameter Φ. The uniplanar orientation parameter Φ is defined as the ratio between the 200 and the 110 peak areas in the X-ray diffraction (XRD) pattern of the film sample as determined in reflection geometry. The polyethylene film may have a value for the uniplanar orientation parameter Φ of at least 2.

The background to the uniplanar orientation parameter Φ is as follows. Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e. intensity as function of the diffraction angle 2θ (this is the angle between the diffracted beam and the primary beam).

The uniplanar orientation parameter gives information about the extent of orientation of the 200 and 110 crystal planes with respect to the film surface. For a film sample with a high uniplanar orientation the 200 crystal planes are highly oriented parallel to the film surface. It has been found that the high tensile strength and high tensile energy to break of the film are generally accompanied by a high uniplanar orientation. The ratio between the 200 and 110 peak areas for a specimen with randomly oriented crystallites is around 0.4. However, the crystallites with indices 200 are preferentially oriented parallel to the film surface, resulting in a higher value of the 200/110 peak area ratio and therefore in a higher value of the uniplanar orientation parameter.

The value for the uniplanar orientation parameter may be determined using an X-ray diffractometer. A Bruker-AXS D8 diffractometer equipped with focusing multilayer X-ray optics (Göbel mirror) producing Cu—Kα radiation (K wavelength=1.5418 Å) is suitable. Measuring conditions: 2 mm anti-scatter slit, 0.2 mm detector slit and generator setting 40 kV, 35 mA. The film specimen is mounted on a sample holder, e.g. with some double-sided mounting tape. Dimensions of the film sample may be 15 mm×15 mm (1×w). Care should be taken that the sample is kept perfectly flat and aligned to the sample holder. The sample holder with the film specimen is subsequently placed into the D8 diffractometer in reflection geometry (with the normal of the film perpendicular to the goniometer and perpendicular to the sample holder). The scan range for the diffraction pattern is from 5° to 40° (2θ) with a step size of 0.02° (2θ) and a counting time of 2 seconds per step. During the measurement the sample holder spins with 15 revolutions per minute around the normal of the film, so that no further sample alignment is necessary. Subsequently the intensity is measured as a function of the diffraction angle 2θ. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The uniplanar orientation parameter is defined as the ratio between the 200 and 110 peak areas. This parameter is a quantitative measure of the uniplanar orientation.

The high uniplanar orientation parameter is also related to the Mw/Mn ratio of the film, in that polymers with a Mw/Mn ratio within the range specified herein can be converted into films with a desirable value for the uniplanar orientation parameter. As indicated above, the film may have a uniplanar orientation parameter of at least 2, at least 3, at least 4, at least 5, or at least 7. Higher values, such as values of at least 10 or even at least 15 may also be obtained. The theoretical maximum value for this parameter may be as high as infinite if the peak area 110 equals zero. High values for the uniplanar orientation parameter are often accompanied by high values for the strength and the energy to break.

The polyethylene film may have a tensile energy to break in at least one direction in the film plane of at least 30 J/g. The tensile energy to break may be in accordance with ASTM D882-00 using a strain rate of 50%/min. It is calculated by integrating the energy per unit mass under the stress-strain curve. Depending on the stretching ratio, films may be obtained, which have a tensile energy to break in at least one direction of at least 35 J/g, at least 40 J/g, at least 50 J/g, at least 70 J/g, or at least 80 J/g.

The polyethylene film may have a modulus in at least one direction in the film plane of at least 3 GPa. The modulus is determined in accordance with ASTM D882-00. Depending on the stretching ratio, moduli may be obtained of at least 4 GPa, or at least 5 GPa. It is possible to obtain moduli of at least 8 GPa or at least 10 GPa.

The film may contain 0.001 to 10 weight % of refractory particles, wherein the refractory particles have an average particle size (D50) below 300 nm. The use of refractory particles with the specified size and in the specified amount may result in increased mechanical properties of the film without substantially affecting the other properties of the material. The refractory particles may be used in an amount of 0.001 to 10 weight %, calculated based on the total of polyethylene and refractory particles. If the amount of particles is too low, the effect may not be fully obtained. If the amount of particles is too high, the performance of the polyethylene may not be further improved, while the presence of the particles may start to detrimentally affect the properties of the polymer. The amount of particles may be at least 0.01 wt. % or at least 0.05 wt. %. The amount of particles may be at most 5 wt. % or at most 3 wt. %. The exact amount of particles may depend on the size of the particles. If the particles are relatively small, a smaller amount of particles may suffice.

The particles may have an average particle size (D50) below 300 nm. The particle size (D50) is defined as the median particle size at the $50^{th}$ percentile, where 50% of the particles (by number) are greater than the D50 and 50% are smaller than the D50. The particle size distribution may be determined via dynamic light scattering. Depending on the nature of the particles, where the particles are present in a polymer matrix, the polymer matrix can be removed, for example by heating the material to burn off the polymer, followed by determination of the particle size. The particle size can also be determined via scanning electron microscopy or transmission electron microscopy or via other suitable methods known in the art. It is within the scope of the skilled person to select a suitable method. The average particle size may be at least 1 nm, at least 5 nm, or at least 10 nm. The average particle size may be at most 200 nm, at most 150 nm, at most 100 nm, or at most 80 nm.

The refractory particles may generally be selected from particles of inorganic oxides, inorganic hydroxides, inorganic carbonates, inorganic carbides, inorganic nitrides, carbon nanotubes, clays, and combinations thereof. The refractory particles may be selected from oxides of aluminium, silicium, titanium, zirconium, and combinations thereof.

Particles of zirconium oxide (zirconia) may be used, such as transformation-toughened zirconium oxide. Transformation-toughened zirconia, which is commercially available, has a microstructure in which the zirconia is in the tetragonal phase. When transformation toughened zirconia is put under stress, the material will transform from the tetragonal phase into the monoclinic phase. This phase transformation is accompanied by expansion of the material. Thus, when transformation-toughened zirconia is put under stress, the expansion of the material caused by the phase transformation will stop propagation of cracks formed in the material. Moreover, the presence of zirconia in the polymer matrix will promote delocalisation of stresses generated during impact, thus circumventing the brittle nature of ceramics. Accordingly, transformation-toughened zirconia is capable of absorbing substantial amounts of energy, and its presence in a ballistic material thus helps to dissipate impact energy. In another embodiment, the refractory particles comprise a carbonate salt of an alkaline earth metal, for example calcium carbonate. The refractory particles may comprise a nitride or a carbide, such as a nitride or carbide of silicon or boron. The refractory particles may be nanotubes, for example carbon nanotubes or boron nitride nanotubes.

A process for manufacturing a polyethylene film may comprise subjecting a starting UHMWPE polymer with a weight average molecular weight of at least 500,000 grams/mole, an elastic shear modulus determined directly after melting at 160° C. of at most 1.4 MPa, and a Mw/Mn ratio of at most 6 to a compacting process, and a stretching process under such conditions that at no point during the process the temperature of the intermediate polymer film is raised to a value above its melting point, wherein in the stretching process a force is applied onto the intermediate polymer film in a first direction and in a second direction which is perpendicular to the first direction.

The starting material of the process may be a highly disentangled UHMWPE. This can be seen from the combination of the weight average molecular weight, the Mw/Mn ratio, the elastic shear modulus, and the fact that the elastic shear modulus increased upon first melting of the polymer.

The starting UHMWPE has an elastic shear modulus $G_N^0$ determined directly after melting at 160° C. of at most 1.4 MPa, at most 1.0 MPa, at most 0.9 MPa, at most 0.8 MPa, or at most 0.7 MPa. The phrase "directly after melting" means that the elastic shear modulus is determined as soon as the polymer has melted, such as, for example, within 15 seconds after the polymer has melted. For this polymer melt $G_N^0$ typically increases from 0.6 to 2.0 MPa in one, two, or more hours, depending upon the molar mass of the polymer. The elastic shear modulus directly after melting at 160° C. is one of the characterising features of the very disentangled UHM-WPE used herein.

$G_N^0$ is the elastic shear modulus in the rubbery plateau region. It is related to the average molecular weight between entanglements $M_e$, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, $\rho$ is the density in g/cm3, R is the gas constant and T is the absolute temperature in K.

A low elastic shear modulus may exemplify long stretches of polymer between entanglements, and thus for a low degree of entanglement. A method for the investigation on changes in $G_N^0$ with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4(8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2).

The UHMWPE used may have a DSC crystallinity of at least 74% or at least 80%. The morphology of the films may be characterised using differential scanning calorimetry (DSC), for example on a Perkin Elmer DSC7. For example, a sample of known weight (2 mg) is heated from 30° C. to 180° C. at 10° C. per minute, held at 180° C. for 5 minutes, then cooled at 10° C. per minute. The results of the DSC scan may be plotted as a graph of heat flow (mW or mils; y-axis) against temperature (x-axis). The crystallinity may be measured using the data from the heating portion of the scan. An enthalpy of fusion $\Delta H$ (in J/g) for the crystalline melt transition is calculated by determining the area under the graph from the temperature determined just below the start of the main melt transition (endotherm) to the temperature just above the point where fusion is observed to be completed. The calculated $\Delta H$ is then compared to the theoretical enthalpy of fusion ($\Delta H_c$ of 293 J/g) determined for 100% crystalline PE at a melt temperature of approximately 140° C. A DSC crystallinity index is expressed as the percentage $100(\Delta H/\Delta H_c)$.

The film and its intermediate products may also have crystallinities as indicated above.

The polyethylene used as starting material may have a bulk density which is significantly lower than the bulk density of conventional UHMWPEs. The UHMWPE used in the process may have a bulk density below 0.25 g/cm³, below 0.18 g/cm³, or below 0.13 g/cm³. The bulk density may be determined in accordance with ASTM-D1895. A fair approximation of this value may be obtained as follows. A sample of UHMWPE powder is poured into a measuring beaker of exact 100 ml. After scraping away the surplus of material, the weight of the content of the beaker is determined and the bulk density is calculated.

Polyethylene can be a homopolymer of ethylene or a copolymer of ethylene with a co-monomer which is another alpha-olefin or a cyclic olefin both with generally between 3 and 20 carbon atoms. Examples include propene, 1-butene, 1-pentene, 1-hexene, 1-heptene, 1-octene, cyclohexene, etc. The use of dienes with up to 20 carbon atoms may also be used, e.g., butadiene or 1-4 hexadiene. The amount of (non-ethylene) alpha-olefin in the ethylene homopolymer or copolymer used in the process may be at most 10 mole %, at most 5 mole %, or at most 1 mole %. If a (non-ethylene)

alpha-olefin is used, it is generally present in an amount of at least 0.001 mol. %, at least 0.01 mole %, or at least 0.1 mole %. What is stated above for the starting material may also apply to the polymer film.

The starting polymer may be manufactured by a polymerization process wherein ethylene, optionally in the presence of other monomers as discussed above, is polymerised in the presence of a single-site polymerization catalyst at a temperature below the crystallization temperature of the polymer, so that the polymer crystallizes immediately upon formation. Reaction conditions may be selected such that the polymerization speed is lower than the crystallization speed. These synthesis conditions force the molecular chains to crystallize immediately upon their formation, leading to a rather unique morphology which differs substantially from the one obtained from the solution or the melt. The crystalline morphology created at the surface of a catalyst will highly depend on the ratio between the crystallization rate and the growth rate of the polymer. Moreover, the temperature of the synthesis, which is in this particular case also crystallization temperature, will strongly influence the morphology of the obtained UHMWPE powder. The reaction temperature may be between −50 and +50° C. or between −15 and +30° C. It is well within the scope of the skilled person to determine via routine trial and error which reaction temperature is appropriate in combination with which type of catalyst, polymer concentrations and other parameters influencing the reaction.

To obtain a highly disentangled UHMWPE it is important that the polymerization sites are sufficiently far removed from each other to prevent entangling of the polymer chains during synthesis. This may be accomplished using a single-site catalyst which is dispersed homogenously throughout the crystallization medium in low concentrations. Concentrations less than $1.10^{-4}$ mol catalyst per liter or less than $1.10^{-5}$ mol catalyst per liter reaction medium may be appropriate. Supported single site catalyst may also be used, as long as care is taken that the active sites are sufficiently far removed from each other to prevent substantial entanglement of the polymers during formation.

Suitable methods for manufacturing starting UHMWPE are known in the art. Reference is made, for example to WO01/21668 and US20060142521.

The starting polymer for the process is generally provided in particulate form, in the form of a powder, or in any other suitable particulate form. Suitable particles may have a particle size of up to 5000 microns, up to 2000 microns, or up to 1000 microns. The particles may have a particle size of at least 1 micron or at least 10 microns.

The particle size distribution may be determined by laser diffraction (PSD, Sympatec Quixel) as follows. The sample is dispersed into surfactant-containing water and treated ultrasonic for 30 seconds to remove agglomerates/entanglements. The sample is pumped through a laser beam and the scattered light is detected. The amount of light diffraction is a measure for the particle size.

A compacting step may be carried out to integrate the polymer particles into a single object, e.g., in the form of a mother sheet. The stretching process may be carried out to provide orientation to the polymer and manufacture the final product. The two steps may be carried out at a direction perpendicular to each other. That is, when in a three-dimensional space, the compacting step take place in the y direction, the stretching process is carried out in the x direction and in the z direction. Combining parts of the compacting process with parts of the stretching process may be possible. For example, these elements can be carried out in a single step, the process can be carried out in different steps, or each step performing one or more of the compacting and stretching elements. The process may include steps of compacting the polymer powder to form a mothersheet, rolling the plate to form rolled mothersheet and subjecting the rolled mothersheet to a stretching process to form a polymer film, wherein in the stretching process a force is applied onto the intermediate polymer film in a first direction and in a second direction which is perpendicular to the first direction.

The compacting force applied generally is 10-10000 $N/cm^2$, 50-5000 N/cm2, or 100-2000 $N/cm^2$. The density of the material after compacting is generally between 0.8 and 1 $kg/dm^3$ or 0.9 and 1 $kg/dm^3$.

The compacting and rolling steps are generally carried out at a temperature of at least 1° C. below the unconstrained melting point of the polymer, at least 3° C. below the unconstrained melting point of the polymer or at least 5° C. below the unconstrained melting point of the polymer. Generally, the compacting step is carried out at a temperature of at most 40° C. below the unconstrained melting point of the polymer, at most 30° C. below the unconstrained melting point of the polymer or at most 10° C. below the unconstrained melting point of the polymer.

The stretching step is generally carried out at a temperature of at least 1° C. below the melting point of the polymer under process conditions, at least 3° C. below the melting point of the polymer under process conditions, or at least 5° C. below the melting point of the polymer under process conditions. The melting point of polymers may depend upon the constraint under which they are put. This means that the melting temperature under process conditions may vary from case to case. It may easily be determined as the temperature at which the stress tension in the process drops sharply. Generally, the stretching process is carried out at a temperature of at most 30° C. below the melting point of the polymer under process conditions, at most 20° C. below the melting point of the polymer under process conditions, or at most 15° C. below the melting point of the polymer under process conditions.

The stretching step may encompass at least two individual stretching steps, wherein the first stretching step is carried out at a lower temperature than the second, and optionally further, stretching steps. The stretching step may encompass at least two individual stretching steps wherein each further stretching step is carried out at a temperature which is higher than the temperature of the preceding stretching step.

The method may be carried out in such a manner that individual steps may be identified, e.g., in the form of the films being fed over individual hot plates of a specified temperature. The method may also be carried out in a continuous manner, wherein the film is subjected to a lower temperature in the beginning of the stretching process and to a higher temperature at the end of the stretching process, with a temperature gradient being applied in between. The method may be carried out by leading the film over a hot plate which is equipped with temperature zones, wherein the zone at the end of the hot plate nearest to the compaction apparatus has a lower temperature than the zone at the end of the hot plate furthest from the compaction apparatus.

The difference between the lowest temperature applied during the stretching step and the highest temperature applied during the stretching step may be at least 3° C., at least 7° C., or at least 10° C. In general, the difference between the lowest temperature applied during the stretching step and the highest temperature applied during the stretching step may be at most 30° C. or at most 25° C.

The unconstrained melting temperature of the starting polymer may be between 138° C. and 142° C. and can easily be determined by the person skilled in the art. With the values indicated above this allows calculation of the appropriate operating temperature. The unconstrained melting point may be determined via DSC (differential scanning calorimetry) in nitrogen, over a temperature range of +30° C. to +180° C., and with an increasing temperature rate of 10° C./minute. A maximum of the largest endothermic peak from 80° C. to 170° C. may be evaluated as the melting point.

In the conventional processing of UHMWPE it was necessary to carry out the process at a temperature which was very close to the melting temperature of the polymer, e.g., within 1 to 3 degrees therefrom. It has been found that the selection of the specific starting polyethylene of the process disclosed herein makes it possible to operate at values which are more below the melting temperature of the polymer than has been possible in the prior art. This makes for a larger temperature operating window which makes for better process control.

The selection of the starting UHMWPE allows the stretching process to be carried out in such a manner that in a process which is carried out below the melting point of the polymer a force is applied onto the intermediate polymer film in a first direction and in a second direction which is perpendicular to the first direction. It has not been possible to perform such a process with polyethylenes with a molecular weight of above 500,000 grams/mole.

Conventional apparatus may be used to carry out the compacting step. Suitable apparatus may include heated rolls, endless belts, etc.

The stretching process step may be carried out to manufacture the polymer film. The stretching step may include a force applied onto the intermediate polymer film in a first direction and in a second direction which is perpendicular to the first direction, both directions being in the plane of the film. The crux of the stretching step is that a force is applied to the intermediate polymer film in two directions, in comparison with a process in which the stretching is carried out in a single direction.

There are various manners in which the process may be carried out.

In the stretching step a force may be applied onto the intermediate polymer film in a first direction, which is the machine direction, and a force may be applied in a direction perpendicular to the machine direction. These stretching steps in different directions can be carried out sequentially, or simultaneously. This process can again be carried out in various ways. The application of a force in the direction perpendicular to the machine direction may be performed by keeping the width of the intermediate polymer film constant during the application of the stretching process in the machine direction. This process may be relatively easy to integrate into existing film-forming processes. However, depending on the stretching ratio desired, it may not always be possible to obtain the limited degree of anisotropy required.

The application of a force in the direction perpendicular to the machine direction may be performed by increasing the width of the intermediate polymer film during the application of the stretching process in the machine direction. This allows the application of higher stretching ratios in the direction perpendicular to the machine direction.

The process may include at least two stretching steps, one in a first direction, and one in a direction in the film plane perpendicular thereto. In any direction, the process may encompass one, two, or even more stretching steps. In the stretching process the intermediate polymer film may be subjected to a force in the first direction during all stretching steps, and to a force in the second direction during at least one stretching step.

The stretching in two directions may be carried out simultaneously or sequentially. Therefore, the stretching process in at least one step may include a force applied in one direction only.

The drawing process may be a biaxial drawing process wherein the film is drawn in the longitudinal direction and then drawn, for example using a tenter, in the transverse direction. Such a biaxial drawing may be either a successive biaxial drawing method or a simultaneous biaxial drawing method. After this drawing step, the film may be optionally further drawn, in the longitudinal direction, in the transverse direction, or in both.

The stretching steps themselves may be carried out in a manner known in the art. For example, a suitable manner for performing a stretching step in one direction only encompasses leading the film in one or more steps over a set of rolls both rolling in process direction wherein the second roll rolls faster that the first roll. Stretching can take place over a hot plate or in an air circulation oven. Another method is stretching using a tentering frame. In tentering, the width of a foil is increased using a tenter frame, which, for example, consists of chains fitted with clips or pins to hold the selvages of the fabric, the frame travelling on tracks to increase the width. Tentering apparatus is known in the art.

The stretching ratio applied in the process may vary within wide ranges.

The total stretching ratio, defined as the area of the cross-section of the compacted mothersheet divided by the cross-section of the drawn film produced from this mothersheet may be at least 40, at least 60, at least 80, at least 100, at least 120, at least 140, or at least 160.

The stretching ratio applied in the first direction and the stretching ratio applied in the second direction may vary within wide ranges. The ratio between the stretching ratio applied in the first direction and that applied in the second direction perpendicular to the first direction in the film plane may be in the range of 0.1-10:1. This means in essence that a film is manufactured with a limited degree of anisotropy. The ratio between the stretching ratio between the first direction and that in the second direction perpendicular to the first direction in the film plane may be in the range of 0.2-5:1, in the range of 0.5-2:1, or in the range of 0.7-1.4:1.

The product of the stretching ratio in the first direction and in the direction perpendicular thereto gives the final stretching ratio.

Refractory particles may be added during the manufacturing process. The refractory particles may be added to the polyethylene before or after polymerization of the ethylene to form ultra-high molecular weight polyethylene. Addition before polymerization may, for example be carried out by preparing a dispersion of the particles in the solvent used for polymerization. Examples of suitable solvents are aromatic and aliphatic hydrocarbons, such as hexane, heptane, cyclohexane, and toluene. Solubility of the polyethylene in the solvent below 50° C., such as below 25° C. is likely negligible and should not influence the physical characteristics of the synthesised polymer. Addition after polymerization may, for example, be carried out by mixing the refractory particles through the polymer, for example by spraying the polymer with a dispersion of the particles in a solvent, or by high-energy ball-milling. Where a solvent is used in the application of the particles, the solvent may be removed by drying, for example under vacuum. The refractory particles may serve as carrier particles for the catalyst.

The process may be carried out in the solid state. The polymer film may have a polymer solvent content of less than 0.05 wt. %, less than 0.025 wt. %, or less than 0.01 wt. %. The same ranges may apply to the starting polymer and to the intermediate products.

DESCRIPTION

The film may be three-dimensional object, which is characterised in that two of its dimensions are substantially larger than the third. The ratio between the second smallest dimension, the width of the film, and the smallest dimension, the thickness of the film may be at least 10 cm or at least 50 cm. The length of the film may be at least as large as the width of the film.

The film may have a width of at least 20 cm, at least 50 cm, at least 100 cm, or at least 150 cm. As a maximum film width a value of at most 500 cm may be mentioned as a general value.

The polymer film may be used in numerous applications, such as where there is need for polyethylene films with a high strength in more than one direction in the film plane, and for example, where this can be combined with a low areal weight. Suitable applications include membranes (e.g., for gas separation applications or for other applications), in solar applications (for example as carrier foils for solar cells), in other applications, such as packaging, in ballistic applications, etc.

The present invention will be further described in the following examples, without being limited thereto or thereby.

Examples

Two polyethylene polymer samples were used. Polymer A has a Mw of $8*10^6$ g/mol, and a Mw/Mn ratio of 5. Polymer B has a Mw of $12*10^6$ g/mol, and a Mw/Mn ratio of 4. Mw and Mn are determined via viscosity measurements as described above.

The polyethylene powder was compacted for 60 minutes at 130° C. to form sheets with a size of 10×0.10 cm². The average thickness of the compacted sheet is given in Table 1. The compacted sheet was rolled in all directions to increase in size two times along both the X-axis and the Y-axis. The thickness of the rolled sheets is given in Table 1.

Samples of 7×7 cm² of the thus-formed rolled sheets were subjected to a first stretching step at a drawing ratio of 2%/sec. The aimed for stretching factor in the X- and Y-direction is given in Table 1. For some samples a second stretching step was carried out, for sample 6 at 1%/sec, for the other samples at 2%/sec. For one sample a third stretching step was carried out, at 2%/sec. All stretching steps were performed at a sample temperature of 130° C. Stretching ratios aimed for are given in Table 1.

The following tables give process conditions and properties of the final film. As can be seen from Table 2, the present invention allows the manufacture of thin films with high biaxial strength.

TABLE 2

| Sample No. | total drawing ratio (calculated from film weight) | drawing ratio along machine direction and transversal direction | average film thickness (microns) | Tensile strength to break in machine direction (GPa) | Tensile strength to break in transversal direction (GPa) |
|---|---|---|---|---|---|
| 1 | 47 | 6.9/6.9 | 27 | 0.26 | 0.27 |
| 2 | 102 | 10.1/10.1 | 12 | 0.41 | 0.53 |
| 3 | 64 | 8.0/8.0 | 20 | 0.54 | 0.41 |
| 4 | 148 | 12.2/12.2 | 9 | 0.42 | 0.35 |
| 5 | 126 | 11.2/11.2 | 8 | 0.36 | 0.49 |
| 6 | 126 | 11.2/11.2 | 8 | 0.52 | 0.44 |

The invention claimed is:

1. A polyethylene film comprising polyethylene and having a ratio between a strength in a first direction in the film plane and a strength in a second direction in the film plane perpendicular to the first direction in a range of about 1:10 to 10:1, the strength in at least one direction in the film plane being at least 0.2 GPa, wherein the polyethylene has a weight average molecular weight (Mw) of at least 500,000 grams/mole and a Mw/Mn ratio of at most 6.

2. The polyethylene film according to claim 1, wherein the ratio between the strength in the first direction in the film plane and the strength in the second direction in the film plane perpendicular to the first direction is in the range of 2:10 to 5:1.

3. The polyethylene film according to claim 1, wherein the strength in the first direction is at least 0.2 GPa, while the strength in the second direction in the film plane perpendicular to the first direction is at least 0.2 GPa.

4. The polyethylene film according to claim 1, wherein the strength of the film, in at least one direction in the film plane, is at least 0.3 GPa.

5. The polyethylene film according to claim 1, wherein the polyethylene has a weight average molecular weight (Mw) of between $1 \times 10^6$ grams/mole and $1 \times 10^8$ grams/mole.

6. The polyethylene film according to claim 1, wherein the polyethylene has a Mw/Mn ratio of at most 4.

7. The polyethylene film according to claim 1, wherein the polyethylene film has a thickness of at most 15 microns.

8. The polyethylene film according to claim 1, further having a uniplanar orientation parameter Φ of at least 2.

9. A method of manufacturing a UHMWPE film, comprising:

subjecting a starting UHMWPE polymer having a weight average molecular weight (Mw) of at least 500,000 grams/mole, an elastic shear modulus determined directly after melting at 160° C. of at most 1.4 MPa, and a Mw/Mn ratio of at most 6, to a solvent-free compacting process and a stretching process under such conditions that at no point during the compacting process and the stretching process is a temperature of the polymer and of

TABLE 1

| Sample No. | polymer | av. sheet thickness after compaction (microns) | av. sheet thickness after rolling (microns) | first drawing step aimed ratio in X and Y | second drawing step aimed ratio in X and Y | second drawing step aimed ratio in X and Y |
|---|---|---|---|---|---|---|
| 1 | B | 1270 | 225 | 4 4 | — | — |
| 2 | B | 1270 | 225 | 4 4 | 2 2 | — |
| 3 | B | 1270 | 225 | 4 4 | 2 2 | — |
| 4 | B | 1270 | 225 | 4 4 | 2 2 | 1.5-1.5 |
| 5 | A | 1010 | 208 | 8 8 | — | — |
| 6 | A | 1010 | 208 | 4 4 | 2 2 | — | an intermediate polymer film raised to a value above their melting point, wherein during the stretching process a force is applied onto the intermediate polymer film during a stretching process, in a first direction and in a second direction which is perpendicular to the first direction.

10. The method according to claim 9, wherein the force applied onto the intermediate polymer film in a first direction is applied in a machine direction, and the force applied in the second direction is applied in a direction perpendicular to the machine direction.

11. The method according to claim 9 wherein the stretching process encompasses at least two stretching steps.

12. The method according to claim 9, wherein the stretching process comprises subjecting the intermediate polymer film to a force in the first direction during all stretching steps, and to a force in the second direction during at least one stretching step.

13. The method according to claim 9, wherein a total stretching ratio, defined as the area of the cross-section of the compacted mothersheet divided by the cross-section of the drawn film produced from the compacted mothersheet, is applied which is at least 40.

14. The method according claim 9, wherein a ratio between a stretching ratio applied in the first direction and a stretching ratio applied in the second direction perpendicular to the first direction in the film plane is in the range of 1:10 to 10:1.

15. The method according to claim 9, wherein the UHMWPE film is in the form of at least of a membrane, packaging, or a product for ballistic applications.

16. The polyethylene film according to claim 1, wherein the strength in the first direction is at least 0.5 GPa, while the strength in the second direction in the film plane perpendicular to the first direction is at least 0.2 GPa.

17. The polyethylene film according to claim 1, wherein the strength in the first direction is at least 1 GPa, while the strength in the second direction in the film plane perpendicular to the first direction is at least 0.2 GPa.

18. The polyethylene film according to claim 1, wherein the strength of the film, in at least one direction in the film plane, is at least 0.5 GPa.

19. The polyethylene film according to claim 1, wherein the strength of the film, in at least one direction in the film plane, is at least 1 GPa.

20. The polyethylene film according to claim 1, wherein the polyethylene has a Mw/Mn ratio of at most 2.

21. The polyethylene film according to claim 1, wherein the polyethylene film has a thickness of at most 7 microns.

22. The method according to claim 9, wherein a total stretching ratio, defined as the area of the cross-section of the compacted mothersheet divided by the cross-section of the drawn film produced from the compacted mothersheet, is applied which is at least 100.

23. The method according to claim 9, wherein a total stretching ratio, defined as the area of the cross-section of the compacted mothersheet divided by the cross-section of the drawn film produced from the compacted mothersheet, is applied which is at least 160.

24. The method according claim 9, wherein a ratio between a stretching ratio applied in the first direction and a stretching ratio applied in the second direction perpendicular to the first direction in the film plane is in the range of 5:10 to 2:1.

* * * * *

UNITED STATES PATENT AND TRADEMARK OFFICE
CERTIFICATE OF CORRECTION

| | |
|---|---|
| PATENT NO. | : 8,771,569 B2 |
| APPLICATION NO. | : 13/143744 |
| DATED | : July 8, 2014 |
| INVENTOR(S) | : Joris Eem Van Der et al. |

Page 1 of 1

It is certified that error appears in the above-identified patent and that said Letters Patent is hereby corrected as shown below:

In the Claims

In col. 14, line 27, "The method according claim 9, wherein a ratio between" should be ---The method according to claim 9, wherein a ratio between---.

Signed and Sealed this
Twenty-eighth Day of October, 2014

Michelle K. Lee
*Deputy Director of the United States Patent and Trademark Office*